(12) United States Patent
Hudd et al.

(10) Patent No.: US 7,816,425 B2
(45) Date of Patent: Oct. 19, 2010

(54) INK COMPOSITION

(75) Inventors: Alan Lionel Hudd, Nuthamspstead (GB); Kristian John Sime, Duxford (GB); James Edward Fox, Cambridge (GB); Jagvl Ramesh Patel, Royston (GB)

(73) Assignee: Garlito B.V., Amsterdam (NL)

( * ) Notice: Subject to any disclaimer, the term of this patent is extended or adjusted under 35 U.S.C. 154(b) by 966 days.

(21) Appl. No.: 10/530,418

(22) PCT Filed: Oct. 6, 2003

(86) PCT No.: PCT/GB03/04297

§ 371 (c)(1),
(2), (4) Date: Jan. 9, 2006

(87) PCT Pub. No.: WO2004/031308

PCT Pub. Date: Apr. 15, 2004

(65) Prior Publication Data

US 2006/0142414 A1    Jun. 29, 2006

(30) Foreign Application Priority Data

Oct. 7, 2002  (GB) .................. 0223219.7

(51) Int. Cl.
*C09D 11/00*  (2006.01)
(52) U.S. Cl. ............. 523/160; 523/161; 106/31.28; 106/31.13; 522/150; 522/74
(58) Field of Classification Search ............ 523/160, 523/161
See application file for complete search history.

(56) References Cited

U.S. PATENT DOCUMENTS 6,534,588 B1 *  3/2003  Locken et al. .......... 524/591

2003/0040551 A1 *  2/2003  Yamaguchi et al. ....... 523/113
2004/0157959 A1 *  8/2004  Turgis et al. ............ 523/160

FOREIGN PATENT DOCUMENTS

| EP | 0 980 343 B1 | | 2/2006 |
| WO | WO 99/29787 | * | 6/1999 |
| WO | WO 00/32667 | * | 6/2000 |
| WO | WO 01/21717 | * | 3/2001 |
| WO | WO 02/46323 A2 | | 6/2002 |

OTHER PUBLICATIONS

Metal Finishing vol. 99, Issue 10, Oct. 2001, p. 50, please refer to website, http://www.sciencedirect.com/science/article/B6TX7-455X3NP-7P/1/b2b67ba0ddc24327127f1f8949ac36df.*
Bieleman, Johan—Additives for Coatings, p. 170, 2000, published by Wiley-vch Verlag GmbH.*
International Search Report, completed Jan. 21, 2004.
International Preliminary Examination Report, completed Oct. 28, 2004.
ADDID® 300** Data Sheet, Wacker-Chemie GmbH.

* cited by examiner

*Primary Examiner*—Vasu Jagannathan
*Assistant Examiner*—Doris L Lee
(74) *Attorney, Agent, or Firm*—Nixon & Vanderhye P.C.

(57) ABSTRACT

A surfactant selected from an acrylate-modified polydimethylsiloxane or a polyether-modified polydimethylsiloxane is used, together with at least a colorant and a UV-curable organic diluent, in a non-aqueous UV-curable ink composition suitable for ink jet printing. The use of this type of surfactant prevents the ink composition from causing the loss of more than 5% of the nozzles in an ink jet print head and enables the composition to provide a hole to area ratio of no more than 0.05. The present ink compositions have particular application in the printing of packaging for foodstuffs.

2 Claims, 2 Drawing Sheets

INK COMPOSITION

Figure 1:
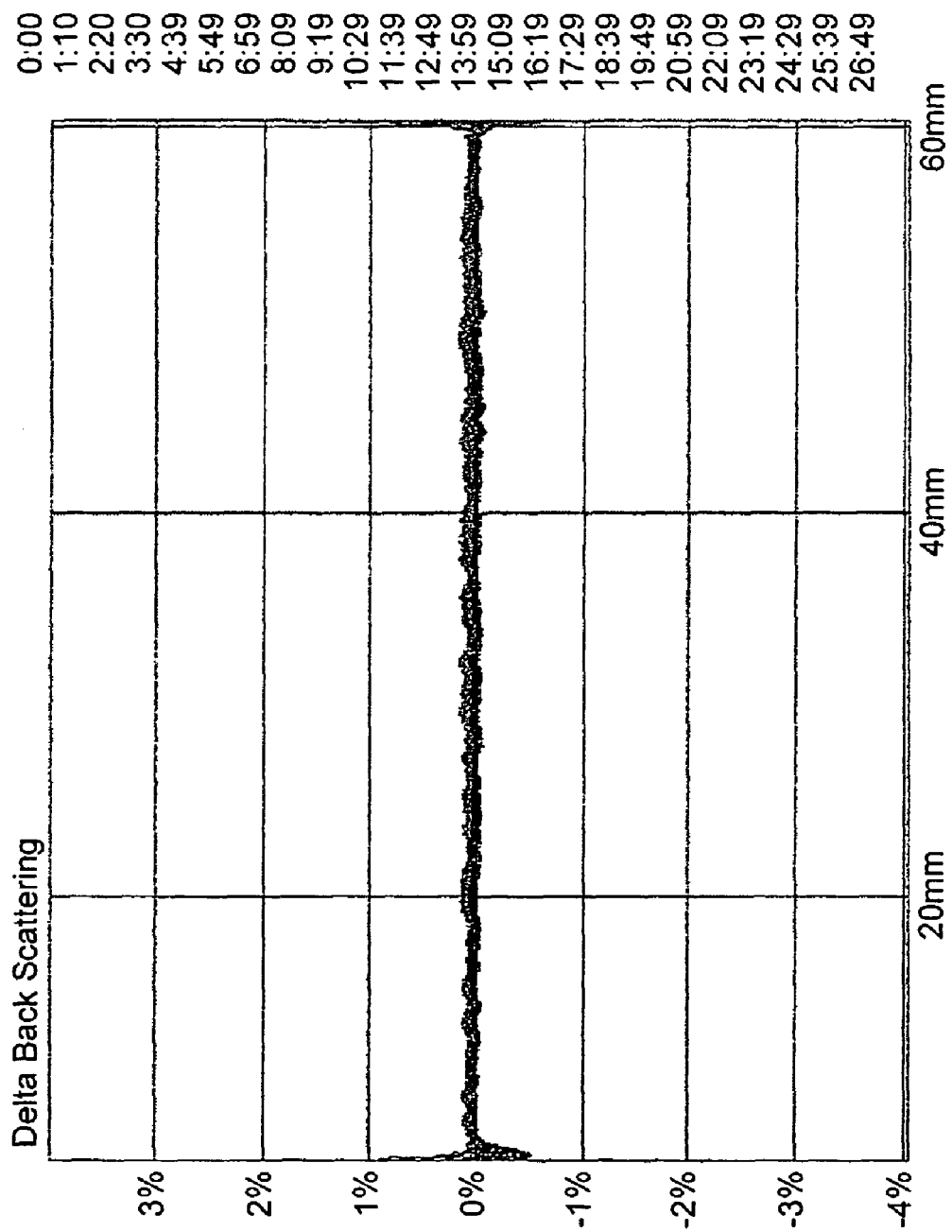

This application claims priority from International Application No. PCT/GB2003/004297, filed on Oct. 6, 2003, and Great Britain Application No. 0223219.7, filed on Oct. 7, 2002, the subject matter of which is incorporated herein by reference.

The present invention relates to printing inks. In particular, the present invention relates to non-aqueous UV-curable ink compositions that are suitable for use in ink jet printing.

UV-curable ink compositions have been used for several years in traditional printing applications such as flexographic printing and screen printing. The development of "clean" (e.g. not harmful, toxic, mutagenic, teratogenic, carcinogenic, etc.) UV-monomers over recent years has meant that inks utilising such materials are being used in applications outside the traditional printing applications. For example, UV-curable ink technology has been shown to have application in ink jet printing (Caiger, UV Curing Ink Jet Inks, Why? Now?; 6th Annual European Annual Ink Jet Printing Conference, November 1998).

The use of UV-curable ink jet ink compositions can provide the following advantages:
- improved durability of the printed image;
- improved print quality on non-porous substrates;
- high image quality;
- no production of volatile organic compounds ("VOCs") as ink dries;
- elimination of heating to remove water;
- high inkjet reliability; and
- low print head maintenance and housekeeping.

Although UV-curable inks are currently the subject of much interest, the commercial uptake of printing systems using such inks is slow. The following disadvantages are frequently cited as reasons for this:
- high cost of UV equipment;
- high cost of materials;
- perceived safety issues in handling of inks containing UV-curable materials;
- perceived hazardous nature of UV-curable monomers; and
- poor industry understanding.

The aforementioned advantages are such that the ink jet industry in general is devoting a significant amount of effort to the development of ink jet printing solutions and systems that utilise UV-curable inks and, thus, the aforementioned list of disadvantages is slowly being reduced.

The following publications disclose examples of UV-curable ink jet printing ink compositions.

U.S. Pat. No. 5,275,646 (Marshall et al; published on 4th Jan. 1994) discloses an ink jet ink comprising a colorant, a polar conductive component and one or more polymerisable monomers. Typically, the ink comprises up to 70 wt % monofunctional monomer, e.g. a vinyl compound or a (meth) acrylic acid ester, and usually up to 70 wt % difunctional monomer, e.g. tripropylene glycol diacrylate. The ink may further comprise up to 10 wt % tri-or more functional monomer, e.g. ethyloxylated trimethylolpropane triacrylate. The total content of polymerisable monomers will usually be 50 to 95 wt %. Further polymerisable material may be incorporated into the ink in order to provide increased viscosity of up to 50 cPs at 25° C. The composition may further comprise a photoinitiator, a stabilizer and a wetting agent such as an industrial organic solvent-based surfactant.

WO-A-99/29787 (Johnson et al; published on 17th Jun. 1999) discloses a radiation curable ink jet ink having a viscosity of no more than 35 cPs at 30° C. comprising a colorant, a diluent consisting essentially of reactive liquid material and, optionally, at least one photopolymerisation catalyst. The reactive liquid material comprises both monfunctional, e.g. monoacrylate(s), and polyfunctional, e.g. di-and triacrylates, material and from 5 to 30 wt % of at least one oligomer (or "prepolymer"). The reactive material comprises a mixture of at least 20 wt % monomer, e.g. acrylates and alkoxy or polyalkoxy derivatives thereof, and at least 5 wt % oligomer, e.g. polyester-, urethane-and epoxy-acrylates, such as Actilane® 251 which is a tri-functional urethane acrylate prepolymer. Alkoxylated acrylates are not regarded as oligomers. The reactive material may also comprise 0.1 to 0.6 wt % of a polymerisable silicone derivative, such as a silicone polyether acrylate, to adjust the surface tension of the ink. The only exemplified silicone polyether acrylate is Tego® Rad 2200 which is usually used at a concentration of 0.4 wt %. Preferred diacrylates include dipropylene glycol diacrylate and preferred triacrylates include ethoxylated trimethylol propane triacrylate. The composition may comprise a dispersant such as Solsperse™ in the range of 15 to 100 wt % of the pigment. The colorant may be carbon black or a pigment dye such as Irgalite® Blue GLVO.

U.S. Pat. No. 6,114,406 (Caiger et al; published on 28th Aug. 1997 as WO-A-97/31071) discloses a radiation curable ink jet ink composition comprising from 80 to 95 wt % of polyfunctional alkoxylated and/or polyfunctional polyalkoxylated acrylate monomer material and a photoinitiator. The polyfunctional alkoxylated and polyalkoxylated acrylate monomer material preferably comprises one or more di-or tri-acrylates and suitable examples include ethoxylated derivatives of trimethylpropane triacetate. The compositions may comprise up to 5 wt % monofunctional or polyfunctional non-alkoxylated radiation curable material such as tripropylene glycol diacetate although it is preferred that such components are omitted all together. The ink compositions may also comprise surfactants and/or other wetting agents. Suitable surfactants are preferably non-ionic and are included in an amount from 0.1 to 10 wt %.

An ink jet printing ink must display the following three characteristics:
- good print head performance, i.e. little or no loss of the nozzles in an ink jet print head;
- good droplet formation between the print head and the substrate to be printed; and
- high quality printing on the surface of the substrate.

The surface tension of the ink is important for both droplet formation and wetting of the surface of the substrate and hence is important to the quality of the printing. Existing ink jet printing inks have one or perhaps two of these characteristics. For example, some printing inks display good wetting and surface tension and hence provide high quality printing but do not display good print head performance whereas, for other printing inks, the reverse is true. In other words, it is difficult to get the balance right between good print head performance and high quality printing. The inventors believe that the choice of surfactant is critical to the overall performance of the ink.

There is a particular problem with the printing of packaging for foodstuffs, in particular liquid foodstuffs such as milk and orange juice, in that, at present, there is no cost effective and efficient way of printing detailed graphical works directly on to packaged foodstuffs. Instead, the material from which the packaging, e.g. the carton, is formed is usually pre-printed before being formed into the packaging. However, there is a drawback in that special packaging for promotions, advertisements, etc. must be planned well in advance and sometimes sufficient time is simply not available so stickers, tags or labels have to be used in conjunction with the usual packaging. In one preferred aspect, the present invention provides an ink jet printing ink composition that may be used on preformed foodstuffs packaging or which may be used in a packing line to print packaging material upstream of its formation into containers.

Any-compounds that might come into contact with food must comply with all the relevant health and safety regulations. Therefore, it is an additional preferred aspect of the present invention that all the components used in the ink composition conform to these regulations.

Preferred ink compositions are resistant to heat and hydrogen peroxide which are encountered in steps in the packaging processes. In addition, due to the nature of the foodstuffs to be packaged, once printed, the ink composition is preferably resistant to lactic acid, citric acid and to "bleeding", i.e. loss of ink from the packaging. Further, the ink desirably also satisfies all of the usual requirements such as high substrate adherence, scratch resistance and short cure time, etc.

According to a first aspect of the present invention, there is provided a non-aqueous UV-curable ink composition for ink jet printing comprising a colorant, a UV-curable organic diluent and a surfactant wherein the surfactant is selected from an acrylate-modified polydimethylsiloxane or a polyether-modified polydimethylsiloxane, said composition causing the loss of no more than 5% of the nozzles in an ink jet print head after 750 prints and providing a hole to area ratio of no more than 0.05. The composition preferably causes the loss of no more than 1% of the nozzles in an ink jet print head after 750 prints and preferably provides a hole to area ratio of no more than 0.02, more preferably 0.007.

The loss of a nozzle is unlikely to be due to blockage. A nozzle is more likely to cease to fire as it has de-primed with printing.

Figure 2:

The term "print" refers to a standard test image reproduced in FIG. 2 and discussed further in Example 5. The "hole to area ratio" is calculated by analysing an area of the print and counting the number of white pixels and dividing this number by the total number of pixels. This analysis method is discussed further in Example 5.

One advantage of the present invention is that the ink composition displays excellent print head performance, droplet formation and quality of printing. In addition, the ink may be made from components that satisfy all of the aforementioned criteria and may be cured rapidly.

In preferred embodiments, the surfactant is an acrylate-modified polydimethylsiloxane, preferably having from twelve to eighteen dimethylsiloxane groups. Typically, it has fifteen dimethylsiloxane groups. The surfactant is preferably a tetraacrylate-modified polydimethylsiloxane. The surfactant may be further organo-modified, for example, a polyether-modified acryl functional polydimethylsiloxane, although it is preferred that it is not further organo-modified. Preferred surfactants are not polyether modified.

The ink composition may comprise from about 0.01 to about 2 wt % surfactant but, preferably, it comprises about 0.1 to about 0.5 wt %, e.g. about 0.3 wt %, surfactant.

According to the first aspect of the present invention, there is also provided a non-aqueous UV-curable ink composition for ink jet printing comprising a colorant, a UV-curable organic diluent and a surfactant wherein the surfactant is a block copolymeric tetraacrylate-modified polydimethylsiloxane having fifteen dimethylsiloxane units.

The surfactant may be a polyether-modified polydimethylsiloxane, e.g. BYK®-333 which is produced by BYK-Chemie GmbH of Abelstrasse 14, D-46483 Wesel, Germany. However, the surfactant is preferably Addid® 300 (a block copolymeric tetraacetate derivative of polydimethylsiloxane having fifteen dimethylsiloxane units) which is produced by Wacker-Chemie GmbH (Silicones Division) of Hanns-Seidel-Platz 4, D-81737 Munich, Germany.

There are many different kinds of colorant and any colorant may be used provided that it is compatible with the remaining components of the ink composition. Black ink may be produced using carbon black whereas cyan ink may be produced using Irgalite® Blue GLVO. Yellow and magenta inks may be produced using Cromophtal Yellow 131AK and Cromophtal Magenta ST respectively. Preferred colorants are pigments although dyes may be used instead. The intensity of colour of the ink depends on the concentration of the colorant. Preferred inks have a colorant concentration from about 1 to about 10 wt %, more preferably about 3 to about 6 wt % and usually about 4.5 wt %.

The UV-curable organic diluent may comprise one or more polymerisable monomers or oligomers. Suitable polymerisable compounds include alkyl acrylates such as octadecyl acrylate (e.g. "ODA"), glycol acrylates such as dipropylene glycol diacrylate ("DPGDA"), alkoxylated glycol acrylates such as ethoxylated trimethylol propane triacrylate and propoxylated neopentyl glycol diacrylate and cross-linking agents such as dipentaerythritol hexaacrylate ("DPHA"). The UV-curable organic diluent comprises from about 75 to about 95 wt % of the total amount of the components in preferred inks and usually about 85 wt % of the total amount.

The ink composition may further comprise one or more photoinitiators. Suitable photoinitiators include 2-benzyl-2-dimethylamino-1-(4-morpholinophenyl)-butanone-1 (Irgacure®369), bis-(2,4,6-trimethylbenzoyl)-phenylphosphineoxide (Irgacuree®819), 2-hydroxy-2-methyl-1-phenyl-propane-1-one (Darocur® 1173) and bis(2,6-dimethoxybenzoyl)-2,4,4-trimethylpentylphosphineoxide (a 3:1 mixture of the last two photoinitiators is supplied under the trade name Irgacure® 1700). The total amount of photoinitiator(s) comprise from about 3 to about 20 wt % of the total amount of the ink composition and usually about 9 wt % of the total amount. A preferred photoinitiator system is a 1:1:1 mixture of Irgacure® 369, 819 and 1700.

The composition may also comprise a dispersant system including at least one dispersant and, optionally, a dispersant synergist. Suitable dispersants include Solsperse™ 24000 and 32000 and suitable dispersion synergists include Solsperse™ 5000 and 22000. The dispersant system may be present in from about 15 to about 50 wt % based the total amount of colorant and, usually, about 27.5 wt % of this total amount.

Preferred ink compositions consist essentially of:
about 1 to about 10 wt % colorant;
about 15 to about 50 wt % dispersant system (based on amount of colorant);
about 75 to about 95 wt % UV-curable organic diluent;
about 0.01 to about 2 wt % surfactant; and
about 3 to about 20 wt % photoinitiator, wherein the total amount of these components equates to 100 wt %.

It is to be understood that the compositions of the present invention may be reformulated for optimum performance depending on the particular combination of components chosen. In addition, proportions are calculated on the basis of the total weight of the final composition unless otherwise indicated.

In a second aspect of the present invention, there is provided an ink jet printing ink cartridge containing an ink composition according to the first aspect of the present invention.

In a third aspect of the present invention, there is provided a method of producing a printed substrate comprising ink jet printing the substrate with an ink composition according to the first aspect of the present invention and then exposing the substrate to UV-radiation. In preferred embodiments, the substrate is packaging containing a foodstuff, in particular a liquid foodstuff such as milk or fruit juice. The substrate may also be a web of foodstuff packaging material upstream of packaging formation.

The present invention will now be further described by way of the following examples of presently preferred embodiments of the invention with reference to the figures in which:

FIG. 1 is a graphical representation of the stability of an ink composition according to the present invention; and FIG. 2 is a reproduction of the standard test image used during testing of the ink compositions of the present invention.

EXAMPLE 1

Dispersion A was prepared from the following components:

| Dispersion A | |
| --- | --- |
| Component | Proportion (wt %) |
| Regal ™ 660 carbon black | 8.0 |
| Solsperse ™ 5000 | 0.2 |
| Solsperse ™ 24000 | 2.0 |
| DPGDA | 64.9 |
| SR-499 | 12.45 |
| SR-454 | 12.45 |

The components were added to a clean mixing vessel and mixed using a Silverson high speed high shear mixer (supplied by Silverson Machines Ltd, Waterside, Chesham, Bucks, HP5 1PQ, UK) for 30 minutes. The mixture was then transferred to an Eiger Mini 250 horizontal bead mill (supplied by Eiger Torrance Ltd, 40 Hardwick Grange, Woolston, Warrington, Cheshire WA1 4RF, UK) containing 1 mm diameter yttrium doped zirconium beads and milled at 3,000 rpm for two hours.

Dispersion A was then let down by the addition of the following components to produce Ink Formulation A (black) having a pigment concentration of 4.5 wt %.

| Ink Formulation A (black) | |
| --- | --- |
| Components | Proportion (wt %) |
| Dispersion A | 12.50 |
| Irgacure ™ 369:1700:819 (1.0:1.0:1.0) | 8.49 |
| DPGDA | 18.925 |
| SR-9003 | 56.775 |
| DPHA | 3.0 |
| Addid ® 300 | 0.3 |
| Viscosity (cPs; 25° C.) | 21.1 |

Regal™ 660 is a carbon black pigment supplied by Cabot Corporation of Two Seaport Lane, Suite 1300, Boston, Mass. 02210, USA;

Solsperse™ 24000 is a low molecular weight hyperdispersant supplied by Avecia Pigments and Additives of Hexagon House, Blackley, Manchester, M9 8ZS, UK;

Solsperse™ 5000 is a dispersant synergist supplied by Avecia;

DPGDA is dipropylene glycol diacrylate supplied by UCB S.A. (Chemical Sector) of Business Unit Industrial Coatings & Graphics, Anderlecht Str. 33, B-1620 Drogenbos, Belgium;

SR-454 is ethoxylated(3) trimethylol propane triacrylate supplied by Sartomer Company Inc. of Oaklands Corporate Center, 502 Thomas Jones Way, Exton, Pa. 19341, USA;

SR-499 is ethoxylated(6) trimethylol propane triacrylate supplied by Sartomer;

Irgacuree 369, 1700 and 819 are photoinitiators supplied by Ciba Speciality Chemicals PLC of Charter Way, Macclesfield, Cheshire SK10 2NX, UK;

SR-9003 is propoxylated(2) neopentyl glycol diacrylate supplied by Sartomer;

DPHA is dipentaerythritol hexaacrylate supplied by UCB; and

Addid® 300 is an acrylate-modified polydimethylsiloxane surfactant supplied by Wacker.

The components were added to a clean mixing vessel and mixed using a Silverson high speed high shear mixer (supplied by Silverson Machines Ltd) for 30 minutes. The ink was then filtered to 1 μm and purged with helium prior to testing in a print head.

EXAMPLE 2

The stability of Ink Formulation A was measured using a Turbiscan Sedimentometer MA2000 (manufactured by Formulaction of 10, Impasse Borde Basse, 31240 L'Union, France). Scans were taken at regular intervals over a period of almost 28 hours and the results are shown in the graph of FIG. 1. The graph plots the degree of back scattering of light through a sample of the ink composition at the regular time intervals shown on the right hand side.

Sedimentometry is generally a very sensitive technique and unstable inks typically show signs of settlement and particle size growth within the first few hours. Neither effect was observed over the entire period of measurement which is a good indication that Ink Formulation A has excellent long term stability.

EXAMPLE 3

The adhesion and wetting of a range of commercially-available ink jet printing inks was measured and compared with that for Ink Formulation A. Overall adhesion was tested by both a fingernail scratch test and a Scotch™ tape adhesion test. Each of the samples tested was then assessed visually for ink removal and rated on a scale of 1 (poor—all ink removed) to 5 (excellent—no ink removed). The wetting of the inks on the substrate was also assessed visually on a scale from 1 (poor wetting) to 5 (excellent wetting). The results of the comparative tests are shown in Table 1.

TABLE 1

|  | Sericol ® Cyan | Sericol ® Magenta | Sericol ® Yellow | Sericol ® Black | Xaar ® Cyan | Xaar ® Yellow | Ink A |
|---|---|---|---|---|---|---|---|
| Wetting | 2 | 3 | 2 | 2 | 4 | 4 | 5 |
| Adhesion | 5 | 5 | 5 | 5 | 5 | 5 | 5 |

EXAMPLE 4

Dispersion B was prepared from the following components using the procedure described in Example 1.

Dispersion B

| Component | Proportion (wt %) |
|---|---|
| Regal ™ 660 carbon black | 8.0 |
| Solsperse ™ 5000 | 0.2 |
| Solsperse ™ 24000 | 2.0 |
| DPGDA | 64.9 |
| SR-499 | 12.45 |
| SR-454 | 12.45 |

Dispersion B was then let down by the addition of the following components using the procedure described in Example 1 to produce Ink Formulation B (black) having a pigment concentration of 4.5 wt %.

Ink Formulation B (black)

| Components | Proportion (wt %) |
|---|---|
| Dispersion B | 56.25 |
| Irgacure ™ 369:1700:819 (1.0:1.0:1.0) | 9.0 |
| DPGDA | 9.435 |
| SR-9003 | 22.015 |
| DPHA | 3.0 |
| Addid ® 300 | 0.3 |
| Viscosity (cPs; 25° C.) | 35.3 |

EXAMPLE 5

Studies to compare the print head performance and wetting of Ink Formulation B with analogous ink formulations (differing only in the choice of surfactant) have been carried out. The comparative inks were made in the same way as Ink Formulation B in Example 4.

| Components | Ink Formulation B | Comparative Ink A | Ink Formulation C |
|---|---|---|---|
| Dispersion B | 56.25 | 56.25 | 54 |
| Irgacure ™ 369:1700:819 (1.0:1.0:1.0) | 9 | 9 | 8.64 |
| DPGDA | 9.435 | 9.735 | 9.0576 |
| SR-9003 | 22.015 | 22.015 | 21.1344 |
| DPHA | 3 | 3 | 2.88 |

-continued

| Components | Ink Formulation B | Comparative Ink A | Ink Formulation C |
|---|---|---|---|
| Addid ® 300 | 0.3 | — | 0.288 |
| Actilane ® 251 | — | — | 4 |
| Viscosity (cPs; 25° C.) | 31.4 | 29.0 | 36.6 |
| Surface tension, dynes/cm | 25.2 | 36.0 | 26.3 |

| Components | Comparative Ink B | Comparative Ink C | Comparative Ink D | Comparative Ink E |
|---|---|---|---|---|
| Dispersion B | 56.25 | 56.25 | 56.25 | 56.25 |
| Irgacure ™ 369:1700:819 (1.0:1.0:1.0) | 9 | 9 | 9 | 9 |
| DPGDA | 9.435 | 9.435 | 9.435 | 9.435 |
| SR-9003 | 22.015 | 22.015 | 22.015 | 22.015 |
| DPHA | 3 | 3 | 3 | 3 |
| Tego ® Rad 2200 N | 0.3 | — | — | — |
| Tego ® Rad 2250 | — | 0.3 | — | — |
| EFKA ® 3232 | — | — | 0.3 | — |
| EFKA ® 3883 | — | — | — | 0.3 |
| Viscosity (cPs; 25° C.) | 30.2 | 30.6 | 30.9 | 30.6 |
| Surface tension, dynes/cm | 25.0 | 25.2 | 26.5 | 29.5 |

| Components | Comparative Ink F | Comparative Ink G | Comparative Ink H | Ink Formulation D |
|---|---|---|---|---|
| Dispersion B | 56.25 | 56.25 | 56.25 | 56.25 |
| Irgacure 369:1700:819 (1.0:1.0:1.0) | 9 | 9 | 9 | 9 |
| DPGDA | 9.435 | 9.435 | 9.435 | 9.435 |
| SR-9003 | 22.015 | 22.015 | 22.015 | 22.015 |
| DPHA | 3 | 3 | 3 | 3 |
| Resiflow ™ FL9 | 0.3 | — | — | — |

-continued

| | | | | |
|---|---|---|---|---|
| Dow Corning 30 | — | 0.3 | — | — |
| BYK®-UV 3500 | — | — | 0.3 | — |
| BYK® 333 | — | — | — | 0.3 |
| Viscosity (cPs; 25° C.) | 30.7 | 30.7 | 31.1 | 30.1 |
| Surface tension, (dynes/cm) | 36.0 | 26.3 | 25.2 | 24.3 |

Tego ® Rad 2200 is a silicone polyether acrylate supplied by Tego Chemie Service GmbH of Goldschmidtstr. 100, 45127 Essen, Germany;
Tego ® Rad 2250 is a silicone polyether acrylate supplied by Tego Chemie Service GmbH;
EFKA ®-3232 is an organically modified polysiloxane supplied by EFKA Chemicals B.V. of Noorderlaan 11, P.O. Box 358, 2180 AJ Hillegom, the Netherlands;
EFKA ®-3883 is a polysiloxane-modified polymer with unsaturated terminal groups supplied by EFKA Chemicals B.V.;
Resiflow™ FL9 is a silicone-free acrylic oligomer supplied by Worlee Chemie GmbH of Sollerstrasse 12–16, D-21481 Lauenburg, Germany;
Dow Corning ® 30 is a polyether modified polydimethylsiloxane supplied by Dow Corning Europe of Rue General de Gaulle 62, B-1310 La Hulpe, Belgium;
BYK ®-UV 3500 is a polyether modified acrylic functional polydimethylsiloxane supplied by BYK-Chemie GmbH; and
BYK ®-333 is a polyether modified acrylic functional polydimethylsiloxane supplied by BYK-Chemie GmbH.

Comparative Ink A is Ink Formulation B without the Addid® 300 wetting agent. Ink Formulation C is Ink Formulation B with 4 wt % Actilane® 251, an aliphatic urethane acrylate additive (use of which is disclosed in WO-A-99/29787) supplied by Akzo Nobel Resins B.V. of Synthesebaan 1, 4616 RB, Bergen op Zoom. Comparative Inks B to H and Ink Formulation D are formulations analogous to Ink Formulation B in which Addid® 300 has been substituted for an alternative wetting agent at 0.3 wt % concentration.

To the inventors knowledge, whilst all of the surfactants tested may have been used as additives in other types of printing ink, none of them has been used to date in ink jet printing ink which has the additional requirement of good print head performance. All proportions are calculated on a wt % basis of the total weight of the compositions unless otherwise stated.

Print head performance was assessed by observing the number nozzles (out of the 125 nozzles in a XJ500 print head provided by XaarJet AB of Elektronikhojden 10, SE-175 43, Jarfalla, Sweden) that were lost after 100, 500 or 750 prints and wetting was quantified by comparing the "hole to area ratio" for each ink.

The "print" is a solid block of colour 125 pixels wide (i.e. the width of one section of the print head used) and 500 pixels long followed by a nozzle check pattern. The image was printed at the frequency specified or desired for the test which, in the present case, was 3.6 kHz. A copy of the image used in the tests is depicted in FIG. 2.

The "hole to area ratio" provides a quantitative indication of the quality of droplet formation and of the wetting of the substrate and is calculated by analysing an area of the print and counting the number of white pixels and dividing this number by the total number of pixels. The difference between a "white pixel" and a "black pixel" is defined by the greyscale threshold. There are 256 levels of greyscale from 0 (white) to 255 (black). For the purposes of these studies, the inventors defined a "white pixel" as a pixel having a greyscale of no more than 50. All measurements were made using the ImageXpert Image Quality Analysis System supplied by VisionJet Ltd of Lumen House, Lumen Rd, Royston, Herts SG8 7AG, UK.

Test print samples were printed using the XJ500 print head supplied by XaarJet AB and then cured and the wetting analysed using the ImageXpert system as described below.

The set-up for the ImageXpert sequence is:

| Processing: | Connectivity |
|---|---|
| Parameters: | Light parts |
| Pick features: | Area |
| Measurement: | Type: Area |
| | Inputs: Area. |

The analysis area (region of interest or "ROI") is the full area of the capture window. The pictures were captured using the standard small area camera system, set to minimum zoom. First, the total area of the ROI was measured by setting the threshold to 0 (so that all of the pixels are counted) and running the measurement. The threshold was then set to 50 and measurements of the hole area were taken. The values recorded for hole area are then divided by the total area value to give the hole to area ratio.

The results of the comparative studies are shown in Table 2.

TABLE 2

| Formulation | Continuous Print (3.6 kHz) | Qualitative Visible Appearance | Quantitative Hole to Area Ratio |
|---|---|---|---|
| Comparative Ink A | 500 prints - no nozzle loss | Poor | 0.55 |
| Ink Formulation B | 750 prints - no nozzle loss | Good | 0.0064 |
| Ink Formulation C | 100 prints - no nozzle loss 750 prints - 1 nozzle lost | Good | 0.012 |
| Comparative Ink B | 100 prints - over 95% nozzle loss | Good | 0.0068 |
| Comparative Ink C | 100 prints - over 95% nozzle loss | Good | 0.0038 |
| Comparative Ink D | 100 prints - over 95% nozzle loss | Good | 0.0071 |
| Comparative Ink E | 100 prints - over 95% nozzle loss | Poor | 0.45 |
| Comparative Ink F | 100 prints - no nozzle loss 750 prints - no nozzle loss | Poor | 0.53 |
| Comparative Ink G | 100 prints - 95% nozzle loss | Good | 0.019 |
| Comparative Ink H | 100 prints - no nozzle loss 500 prints - over 95% nozzle loss | Good | 0.0072 |
| Ink Formulation D | 100 prints - no nozzle loss 750 prints - 4 nozzles lost | Good | 0.0080 |

The results indicate that when a wetting agent is not used (Comparative Ink A), the ink displays excellent print head performance but very poor wetting (with a high hole to area ratio of 0.55). When Addid® 300 is used as the wetting agent (Ink Formulations B and C), the ink displays both excellent print head performance (with no or one nozzle loss after 750 prints) and good wetting (with a low hole area ratios of 0.0064 and 0.012 respectively). The presence of Actilane® 251 (Ink Formulation C) reduces the print head performance and increases the hole to area ratio. Of the remaining Comparative Inks, only one (Comparative Ink F—Resiflow™ FL9 as surfactant) displayed excellent print head performance (with no nozzle loss after 750 prints) but this formulation displayed very poor wetting (with a high hole to area ratio of 0.53) and, thus, is unsuitable as an ink jet printing ink. Ink Formulation D (BYK®-333 as surfactant) has reasonable print head performance (with the loss of 4 nozzles after 750 prints) but good wetting (with low hole to area ratio of 0.0080).

EXAMPLE 6

In order to show that alternative colour inks could be prepared according to this invention, Dispersion E was prepared from the following components using the procedure described in Example 1.

| Dispersion E | |
|---|---|
| Component | Proportion (wt %) |
| Irgalite ™ Blue GLVO | 8.0 |
| Solsperse ™ 5000 | 0.2 |
| Solsperse ™ 24000 | 2.0 |
| DPGDA | 64.9 |
| SR-499 | 12.45 |
| SR-454 | 12.45 |

Dispersion E was then let down using the procedure described in Example 1 by the addition of the following components to produce Ink Formulation E (cyan) having a pigment concentration of 4.5 wt %.

| Ink Formulation E (cyan) | |
|---|---|
| Components | Proportion (wt %) |
| Dispersion E | 56.25 |
| Irgacure ™ 369:1700:819 (1.0:1.0:1.0) | 9.0 |
| DPGDA | 9.435 |
| SR-9003 | 22.015 |
| DPHA | 3.0 |
| Addid ® 300 | 0.3 |
| Viscosity (cPs; 25° C.) | 26.5 |

Irgalite ™ Blue GLVO is a cyan pigment supplied by Ciba Speciality Chemicals PLC of Charter Way, Macclesfield, Cheshire SK10 2NX, UK.

The results clearly show that only the use of Addid® 300 (and to a lesser extent BYK®-333) provides excellent print head performance combined with good wetting. In addition, the ink compositions display very high stability at very low viscosity which is advantageous for ink jet printing as ink jet print heads are capable of jetting only low viscosity fluids. Viscosity often limits the concentration of colorant that may be included in an ink formulation and hence limits the colour strength (optical density) of the final printed images. The compositions of the present invention have low viscosity and high optical density which is ideal for ink jet printing. Further, the present compositions show improved adhesion and wetting over the range of commercially available ink jet printing inks tested.

It will be appreciated that the invention is not restricted to the details described above with reference to the preferred embodiments but that numerous modifications and variations can be made without departing from the scope of the invention as defined in the following claims.

The invention claimed is:

1. A non-aqueous UV-curable ink composition for ink jet printing consisting essentially of:
    about 4.5% of a colorant;
    a dispersant system providing about 0.1% a dispersant synergist and about 1 wt% of a low molecular weight hyperdispersant;
    about 45 wt% of dipropylene glycol diacrylate;
    about 22 wt% propoxylated(2) neopentyl glycol diacrylate;
    about 7 wt% of ethoxylated(6) trimethylol propane triacrylate;
    about 7 wt% of ethoxylated(3) trimethylol propane triacrylate;
    about 3 wt% dipentaerythritol hexaacrylate;
    about 9 wt% photoinitiator; and
    about 0.3 wt% tetra-acrylate-modified polydimethylsiloxane surfactant having fifteen dimethylsiloxane groups;
    said composition causing the loss of no more than 5% of the nozzles in an ink jet print head after 750 prints and providing a hole to area ratio of no more than 0.007.

2. The ink composition as claimed in claim 1 wherein the composition causes the loss of no more than 1% of the nozzles in an ink jet print head after 750 prints.

* * * * *